Figure 1:
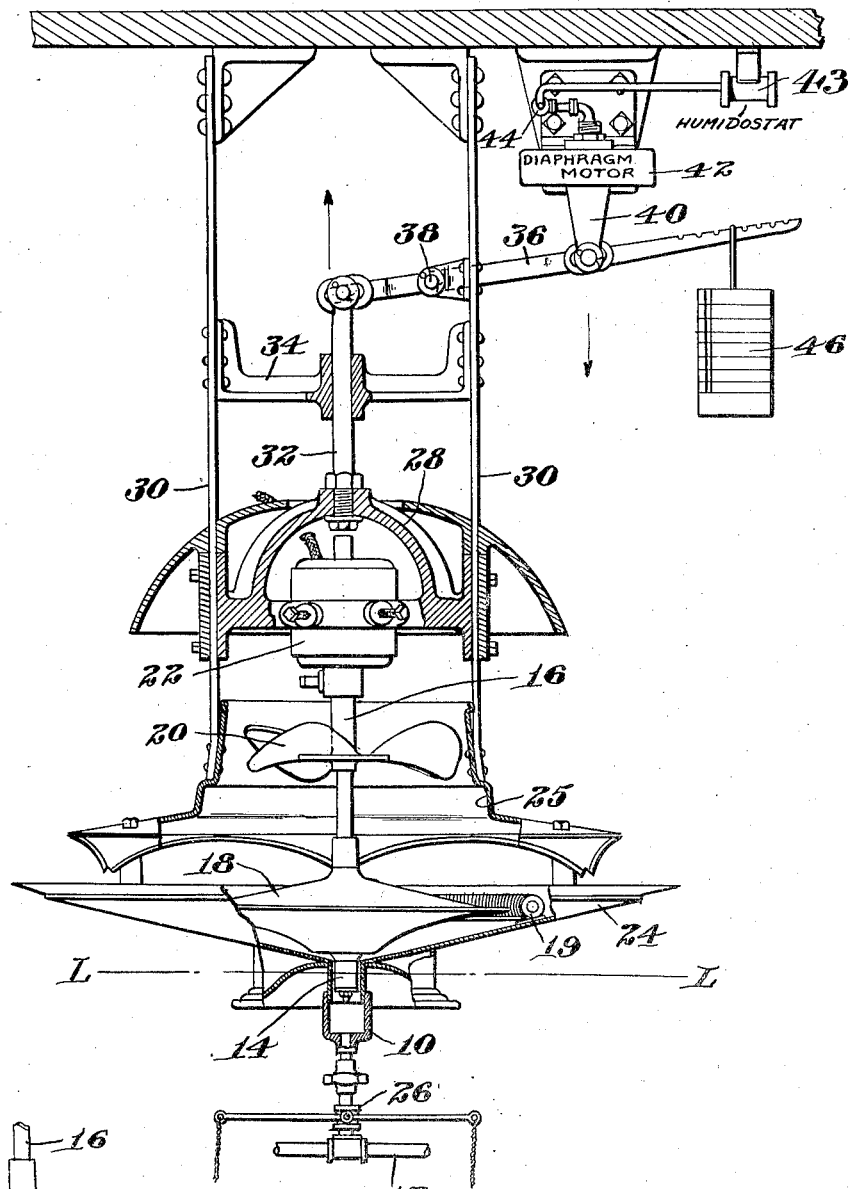

Feb. 9, 1926.

J. W. JACKSON

HUMIDIFIER CONTROL

Filed August 7, 1923

1,572,432

Inventor
John W. Jackson
by Mitchell, Chadwick & Kent
Attorneys

Patented Feb. 9, 1926.

1,572,432

UNITED STATES PATENT OFFICE.

JOHN W. JACKSON, OF FALL RIVER, MASSACHUSETTS, ASSIGNOR TO AMERICAN MOISTENING COMPANY, OF BOSTON, MASSACHUSETTS, A CORPORATION OF MAINE.

HUMIDIFIER CONTROL.

Application filed August 7, 1923. Serial No. 656,241.

*To all whom it may concern:*

Be it known that I, JOHN W. JACKSON, a citizen of the United States, residing at Fall River, in the county of Bristol and State of Massachusetts, have invented certain new and useful Improvements in Humidifier Controls, of which the following is a specification.

This invention relates to improvements in humidifier controls. More particularly it relates to individual unit control. It is an object to provide means for making the humidifier absolutely and instantly dead, so far as all flow of water is concerned, while its air propulsion and distribution continues. To this end there is provided means to maintain a body of still water at a certain level, and a humidifier which has a part immersible therein, and is capable both of lifting its own supply of water from such a body of still water to operate as a humidifier, and of operating merely as a fan, at a slightly higher elevation whereas it does not reach the water. Under these circumstances the water level may be maintained still and unchanged, without any flow or wastage of water, while the apparatus is working on air only; and the distribution of water may begin again upon the shifting of the apparatus to a slightly lower level where its water raising device dips below the water level.

In such case the water extracted may be replenished automatically, whenever it is withdrawn, from any humidifier in a series, by devices well known, as by a constant level feed from a tank wherein water is maintained at the desired level by a float valve; and no water need be fed to those which are not actively humidifying. This makes it possible to start and to stop the humidifying action of individual units at irregular intervals, according as the operator or local automatic detector apparatus may determine that the humidifying action is or is not needed. The apparatus may also be controlled as heretofore proposed by a valve which may cut off or turn on the water supply.

The objects of the invention are accomplished by applying control means comprising a diaphragm motor to each humidifying unit in such manner as to lift the water-raising member thereof above the water level, when it is desired to stop the humidifying; and to restore it to immersed relation when that is to be started again; without affecting in the meantime the continuous operation of the air circulating means. The control apparatus may be the customary diaphragm, which under influence of a suitable humidostat becomes subject to air pressure or is relieved of air pressure through a small pipe from a source of compressed air. The weight of the operatively liftable parts of the humidifier may be so nearly counter-balanced that a reasonably small diaphragm would serve this purpose, while it would not require a diaphragm beyond reasonable size even to handle such weight without counter-balancing. In such case, the sensitive detecting apparatus, which may be connected to operate either for a single or a battery of motor shifts for humidifiers, admits or releases compresed air to the diaphragm whose movement lifts or lowers the humidifying parts; and the combination is such that this lifting completely stops the movement of water. This leaves the apparatus, as far as the water is concerned, entirely inactive. Hence no further attention, such as shutting it off with a valve, need be paid to the water.

Apparatus illustrating an embodiment of the invention is shown in the accompanying drawings, but it will be understood that variations may be made. It is intended that the patent shall cover, by suitable expression in the appended claims, whatever features of patentable novelty exist in the invention disclosed so far as the same relate to cessation and resumption of humidifying action.

Figure 2:
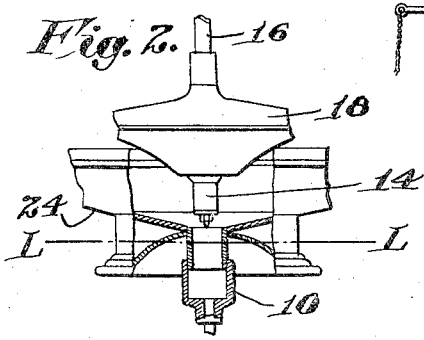

In the accompanying drawings:

Figure 1 is an elevation, partly in section of apparatus embodying the present invention, showing the parts in humidifying position; and Figure 2 is another elevation of a portion of the apparatus showing the relative positions of the parts in non-humidifying position.

Referring to the drawings, the water to be atomized is maintained constantly at a uniform level L—L, in a fixed well 10 at the base of the humidifier. This may be done by means of a gravity feed tank (not shown) from which the distributing pipe 12 leads to and supplies the well. Water is drawn upward from the latter by a suitable pump details of which are covered by the tube 14 which represents it diagrammatically. This pump may be a screw on the lower end of a vertical shaft 16 which also carries the disk-like rotor 18, fan 20 and electric motor 22. When the pump dips below water level in the well, and the shaft is turning, water flows through the apparatus, being drawn up to the under side of the rotor 18, over which it flows in a thin film and by which it is thrown centrifugally against generating blades 19 fixed to the bottom pan 24 of the humidifying casing, being thereby broken up into fog-like particles. These are picked up and absorbed by a blast of air driven downward and thence outward through the casing 25 by the fan above. When it is desired to stop the humidifying action, it is of course possible to either switch off the electric current or else to close the water valve 26 in the supply line. It is usually desired, however, to keep the fan going to provide continued circulation of air. If this is done, and the water valve is closed, there will nevertheless be a continuation of the humidifying effect until the water supply in the well has been exhausted beyond the reach of the pump. The present invention is to provide a more satisfactory control, by which the rotation of the fan is maintained unchanged and by which the flow of water is instantaneously stopped, although no valve is closed and no change is effected in the water supply.

This control is made possible by mounting the electric motor and shaft, and the rotating parts carried thereby, namely the fan, rotor and pump, on a sub-frame 28 which is slidable vertically along the hangers 30 which support the apparatus from the ceiling. Attached to this sub-frame is a rod 32 movable in an upper guide, 34, having a pin and slot connection with one end of a rocker lever 36 pivoted at 38 on one of the hangers. Beyond the pivot this lever is connected to the plunger 40 of a diaphragm motor 42 which operates under the influence of a humidostat 43 with which it is connected by pipe 44, so that air under pressure may be fed through the pipe 44 to the diaphragm, causing it to be distended and force its plunger downward. This movement rocks the lever 36 and by so doing lifts the sub-frame, the electric motor and the rotating parts, the pump coming clear of the water in the well, and breaking instantly the connection with the water supply. This stops all further flow of water through or within the apparatus. The power of the diaphragm motor may easily be ample to cause the shifting of the various parts, on the basis of air pressures which are commonly used in such apparatus, or the weight of the parts to be lifted may be nearly counterbalanced by applying weights 46 to the opposite end of the rocker lever, in which case but little effort is required by the diaphragm motor to make the shift. While the pump is thus free from the water, the fan continues to rotate giving a continuous circulation of air through the casing and into the room. Meanwhile the water is standing quiet at its normal level, ready to be picked up whenever the humidostat 43 responds to a change in the condition of the atmosphere, and releases the air pressure on the diaphragm. When this occurs the weight of the lifted parts causes them to descend and again to submerge the pump in the water. The humidifying action thereupon immediately begins again and continues as long as needed. The total travel may be very short as the level of the water is precise and it is only necessary that the pump get far enough above it to clear it. While the invention is shown applied to apparatus which rotates on a vertical axis, it is applicable to other styles, it being only necessary to break the pump and water connection by lifting the pump. And although in the apparatus illustrated this entails lifting the greater portion of the entire unit, including the rotor and motor, it will be observed that this is because the pump is on the same shaft with them, and that in some types of humidifier would not be requisite, provided the pump were separately movable.

I claim as my invention:

1. The combination of a humidifier having a supply of still water below, a fan above, and means between these for lifting water from said supply and discharging it into the blast created by said fan, with control means responsive to increase of humidity in the air adapted to move said water lifting means away from said water supply, thereby to stop the discharge of water into the air.

2. The combination with a humidifier having a supply of still water at its base, and means adapted to lift water therefrom and to discharge it into the atmosphere, of control means responsive to increase of humidity in the atmosphere adapted to raise said water-lifting means from said supply, thereby to stop said discharge.

3. The combination with a humidifier having a supply of still water at its base and rotatable means comprising a pump adapted to lift water from said supply and discharge it into the atmosphere, of control means responsive to increase of humidity in the atmosphere adapted to lift said rotatable means away from said supply, whereby the flow of water within the apparatus is stopped.

4. The combination with a humidifier, having a supply of still water at its base, maintained at a fixed level, and having means dipping into said supply adapted to lift water therefrom to be atomized in the humidifier, of control means responsive to changes of humidity adapted alternately upon increase or decrease of humidity respectively to withdraw said water-lifting means from said supply and to immerse it therein.

5. The combination with a humidifier having a frame, a supply of still water at its base, maintained at a fixed level, and having means dipping into said supply adapted to lift water therefrom to be atomized in the humidifier; of control means comprising a sub-frame slidably mounted on the frame of said humidifier and carrying said water lifting means; a lever connected to said sub-frame and pivoted on said humidifier frame; and a diaphragm motor adapted to rock said lever to raise said sub-frame and water lifting means, whereby the flow of water through the humidifier is stopped.

6. The combination with a humidifier having a supply of still water at its base, maintained at a fixed level, and having means dipping into said supply adapted to lift water therefrom to be atomized in the humidifier; of control means comprising a lever attached on one side of its fulcrum to said water-lifting means, and a weight on the other side of said fulcrum nearly counterbalancing said water-lifting means; and a motor connected to said lever, adapted to cooperate with said weight to raise said water-lifting means, thereby stopping flow of water in the apparatus.

Signed at Boston, Massachusetts, this twenty-fifth day of April, 1923.

JOHN W. JACKSON.